(12) United States Patent
Kruger et al.

(10) Patent No.: US 8,037,281 B2
(45) Date of Patent: Oct. 11, 2011

(54) MISS-UNDER-MISS PROCESSING AND CACHE FLUSHING

(75) Inventors: Warren F. Kruger, Sunnyvale, CA (US); Wade K. Smith, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 737 days.

(21) Appl. No.: 11/889,753

(22) Filed: Aug. 16, 2007

(65) Prior Publication Data

US 2007/0288721 A1 Dec. 13, 2007

Related U.S. Application Data

(63) Continuation-in-part of application No. 11/549,570, filed on Oct. 13, 2006, now Pat. No. 7,539,843, which is a continuation-in-part of application No. 11/102,210, filed on Apr. 7, 2005, now Pat. No. 7,447,869.

(51) Int. Cl.
*G06F 12/00* (2006.01)

(52) U.S. Cl. ........ 711/207; 711/118; 711/122; 711/202; 711/E12.057; 711/E12.061

(58) Field of Classification Search .................. None
See application file for complete search history.

(56) References Cited

U.S. PATENT DOCUMENTS

| | | | |
|---|---|---|---|
| 5,946,718 A * | 8/1999 | Green | 711/207 |
| 6,189,074 B1 | 2/2001 | Pedneau | |
| 6,370,632 B1 | 4/2002 | Kikuta et al. | |
| 6,381,682 B2 | 4/2002 | Noel et al. | |
| 6,446,186 B1 | 9/2002 | Priem et al. | |
| 6,560,688 B1 | 5/2003 | Strongin et al. | |
| 6,832,297 B2 * | 12/2004 | Pfister et al. | 711/144 |
| 7,003,647 B2 | 2/2006 | Jacobs et al. | |
| 2002/0144001 A1 * | 10/2002 | Collins et al. | 709/250 |
| 2002/0169936 A1 | 11/2002 | Murphy | |
| 2002/0184392 A1 * | 12/2002 | Parthasarathy et al. | 709/249 |
| 2006/0133396 A1 * | 6/2006 | Shah et al. | 370/412 |

OTHER PUBLICATIONS

International Search Report and Written Opinion for International Application No. PCT/IB2006/000973, mailed on Oct. 19, 2006, 11 pages.

* cited by examiner

*Primary Examiner* — Michael Krofcheck (74) *Attorney, Agent, or Firm* — Sterne, Kessler, Goldstein & Fox P.L.L.C.

(57) ABSTRACT

Described herein are systems and methods that reduce the latency which may occur when a level one (L1) cache issues a request to a level two (L2) cache, and that ensure that a translation requests sent to an L2 cache are flushed during a context switch. Such a system may include a work queue and a cache (such as an L2 cache). The work queue comprises a plurality of state machines, each configured to store a request for access to memory. The state machines can monitor requests that are stored in the other state machines and requests that the other state machines issue to the cache. A state machine only sends its request to the cache if another state machine is not already awaiting translation data relating to the that request. In this way, the request/translation traffic between the work queue and the cache can be significantly reduced.

12 Claims, 7 Drawing Sheets

MISS-UNDER-MISS PROCESSING AND CACHE FLUSHING

CROSS REFERENCE TO RELATED APPLICATIONS

This application is a continuation-in-part of U.S. patent application Ser. No. 11/549,570 to Kruger et al., entitled "Virtual Memory Fragment Aware Cache" and filed Oct. 13, 2006 (now U.S. Pat. No. 7,539,843), which is a continuation-in-part of U.S. patent application Ser. No. 11/102,210 to Kruger et al., entitled "Method and Apparatus for Fragment Processing in a Virtual Memory System" and filed Apr. 7, 2005 (now U.S. Pat. No. 7,447,869), the entirety of each of the foregoing applications is incorporated by reference herein.

BACKGROUND OF THE INVENTION

1. Field of the Invention

The present invention is generally directed to memory systems in computers, and more particularly to virtual memory systems in computers.

2. Background Art

The ever-increasing capability of computer systems drives a demand for increased memory size and speed. The physical size of memory cannot be unlimited, however, due to several constraints including cost and form factor. In order to achieve the best possible performance with a given amount of memory, systems and methods have been developed for managing available memory. One example of such a system or method is virtual addressing, which allows a computer program to behave as though the computer's memory was larger than the actual physical random access memory (RAM) available. Excess data is stored on hard disk and copied to RAM as required.

Virtual memory is usually much larger than physical memory, making it possible to run application programs for which the total code plus data size is greater than the amount of RAM available. This is known as "demand paged virtual memory." A page is copied from disk to RAM ("paged in") when an attempt is made to access it and it is not already present. This paging is performed automatically, typically by collaboration between the central processing unit (CPU), the memory management unit (MMU), and the operating system (OS) kernel. The application program is unaware of virtual memory; it just sees a large address space, only part of which corresponds to physical memory at any instant.

The virtual address space is divided into pages. Each virtual address output by the CPU is split into a (virtual) page number (the most significant bits) and an offset within the page (the N least significant bits). Each page thus contains $2^N$ bytes. The offset is left unchanged and the MMU maps the virtual page number to a physical page number. This is recombined with the offset to give a physical address that indicates a location in physical memory (RAM).

The performance of an application program depends dramatically on how its memory access pattern interacts with the paging scheme. If accesses exhibit a lot of locality of reference (i.e., each access tends to be close to previous accesses) the performance will be better than if accesses are randomly distributed over the program's address space, thus requiring more paging. In a multitasking system, physical memory may contain pages belonging to several programs. Without demand paging, an OS would need to allocate physical memory for the whole of every active program and its data, which would not be very efficient.

Current computer systems, even relatively small scale personal computer systems, include multiple subsystems and/or coprocessors working with the CPU and OS to perform specialized functions. For example, graphics coprocessors (or graphics processing units (GPUs)), floating point coprocessors, networking processors, and other types of coprocessors are used to process large amounts of data with as much speed as possible and include large amounts of memory. A consistent set of rules governs access to the physical memory for all of the system elements or subsystems requesting such access. For example, the OS may dictate a page size and page table format to which each subsystem must interface for virtual memory accesses.

A page table in a virtual memory system is an array that contains an entry for each current virtual-to-physical address translation. A page table entry (PTE) in the page table typically contains a physical page number and flag bits. Pages are of a uniform size and the smaller the page size, the less likely a reference to a particular address will result in a cache hit. Accessing the page table to perform a virtual memory to physical memory translation can be slow, and may result in latency in the performance of the application program.

To reduce such latencies, many virtual memory systems include a translation look-aside buffer (TLB) and a cache. In general, performance of a virtual memory/page table translation system is based on the hit rate in the TLB. A TLB is a table that lists the physical address page number associated with each virtual address page number. A TLB is typically used as a cache whose tags are based on virtual addresses. The virtual address is presented simultaneously to the TLB and to the cache so that cache access and the virtual-to-physical address translation can proceed in parallel (the translation is done "on the side"). If the requested address is not cached, the physical address is used to locate the data in memory that is outside of the cache. This is termed a cache "miss." If the address is cached, this is termed a cache "hit."

Some virtual memory systems include multi-level cache systems. A multi-level cache system can reduce latencies while achieving a relatively high cache hit rate. Such a multi-level cache system may, for example, include a level one (L1) cache and a level two (L2) cache. The L1 cache provides a small cache that may be checked quickly to determine whether there is a cache hit. Due to its small size, however, the L1 cache typically has a relatively low cache hit rate, but otherwise performs well when there is commonality of reference. In contrast, the L2 cache provides a large cache. Due to its large size, the L2 cache typically has a relatively high cache hit rate but may take a relatively long time to determine whether there is a cache hit. In response to an address request, the L1 cache is checked first for the requested address. If there is a cache miss in the L1 cache, the L2 cache is checked for the requested address. In this way, the L1 cache provides for reduced latency (by enabling fast cache access) and the L2 cache provides for a high cache hit rate (by enabling storage of many page table entries).

However, it is desirable for virtual memory systems accessing a physical memory to employ techniques that increase hit rates. Challenges encountered in the design of such virtual memory systems include the constraints imposed by the memory architecture to which the virtual memory system must interface, including a fixed page size and a dictated page table entry format. It is also desirable for such techniques to be implemented in a multi-level cache system.

Given the foregoing, what is needed are improved virtual memory systems and methods.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention provide systems and methods for facilitating the translation of logical memory addresses to physical memory addresses. For example, a first embodiment provides systems and methods that reduce the latency that may occur when an L1 cache issues a request to an L2 cache, and a second embodiment provides systems and methods that ensure that a translation request sent to an L2 cache is flushed if a page table is modified.

A system in accordance with the first embodiment includes a work queue and a cache (such as an L2 cache). The work queue comprises a plurality of state machines. Each state machine is configured to store one of a plurality of requests for access to memory. Each memory access request includes a logical memory address that must be translated to a physical memory address. The cache includes a plurality of page table entries. Each page table entry provides a translation from a logical memory address to a physical memory address. The state machines can monitor requests that are stored in the other state machines and requests that the other state machines issue to the cache. A state machine only sends its request to the cache if another state machine is not already awaiting translation data relating to the that request. In this way, the request/translation traffic between the work queue and the cache can be significantly reduced.

A system in accordance with the second embodiment includes at least one TLB and a cache (such as an L2 cache). The at least one TLB is configured to translate a first collection of logical memory addresses into physical memory addresses based on a first plurality of page table entries included in the at least one TLB. In response to a notification that a first page table is to be modified (such as a signal initiating a context switch, a preemption operation, a stall-on-fault condition, or the like), the at least one TLB issues a flush request to the cache. In response to the flush request, a plurality of flush packets are sent through the cache, wherein each flush packet traverses a corresponding translation path within the cache. After traversing through the cache, each flush packet returns to the at least one TLB indicating that any translation requests corresponding to the first page table have been entirely flushed from the cache. This mechanism insures that translation requests corresponding to the first page table are flushed from the L2 cache. Modifications to a page table may occur, for example, during a preemption operation or a context switch.

The first and second embodiments are described in more detail below. To better understand these embodiments, however, it is helpful to first describe an example computer system in which such embodiments may be implemented.

II. An Example Computer System

A. Overview

Figure 1:
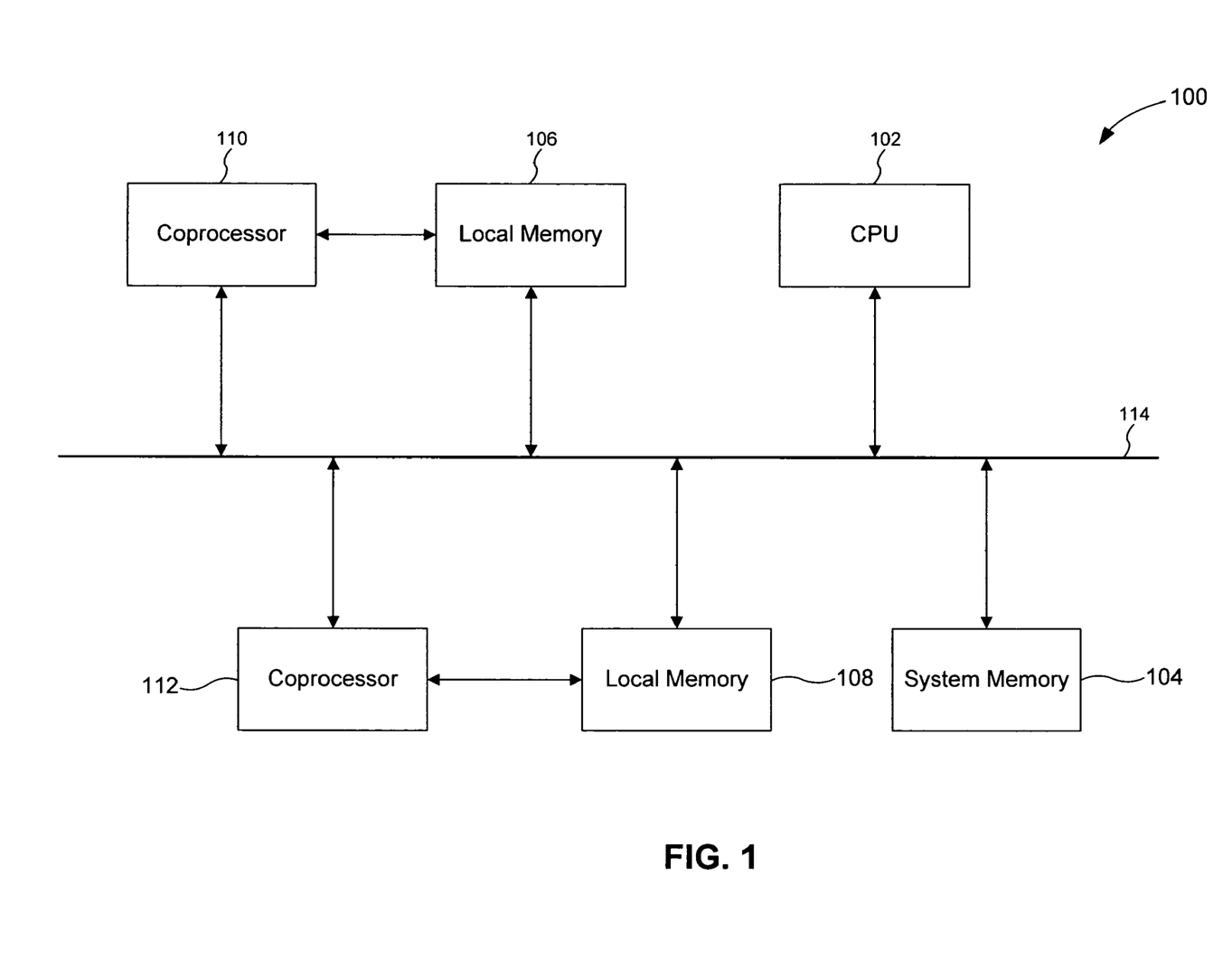
FIG. 1 illustrates an example computer system, including a co-processor, in accordance with an embodiment of the present invention.

FIG. 1 is a block diagram of an example computer system 100 in accordance with the present invention. System 100 includes a central processing unit (CPU) 102, and a system memory 104. In general, system memory 104 stores data that can be accessed by any processor of system 100. A coprocessor 110 and a coprocessor 112 communicate with CPU 102 and the system memory over a bus 114. Bus 114 can be any type of bus used in computer systems, including a peripheral component interface (PCI) bus, an accelerated graphics port (AGP) bus, and a PCI Express (PCIE) bus. Coprocessors 110 and 112 assist CPU 102 by performing certain special functions, usually much faster than CPU 102 could perform them in software. In some cases coprocessors 110 and 112 decode instructions in parallel with CPU 102 and execute only those instructions intended for them. Coprocessor 110 and/or coprocessor 112 may include, but are not limited to, a floating point coprocessor, a graphics processing unit (GPU), a networking coprocessor, and other types of coprocessors and processors as would be apparent to a person skilled in the relevant art(s).

System 100 further includes local memory 106 and local memory 108. Local memory 106 is coupled to coprocessor 110 and also coupled to bus 114. Local memory 108 is coupled to coprocessor 112 and also coupled to bus 114. The local memories 106 and 108 are available to coprocessors 110 and 112 respectively in order to provide faster access to certain data that is frequently or recently used by the respective coprocessors than would be possible if the data were stored in system memory 104.

B. Page Table Unit

Figure 2:
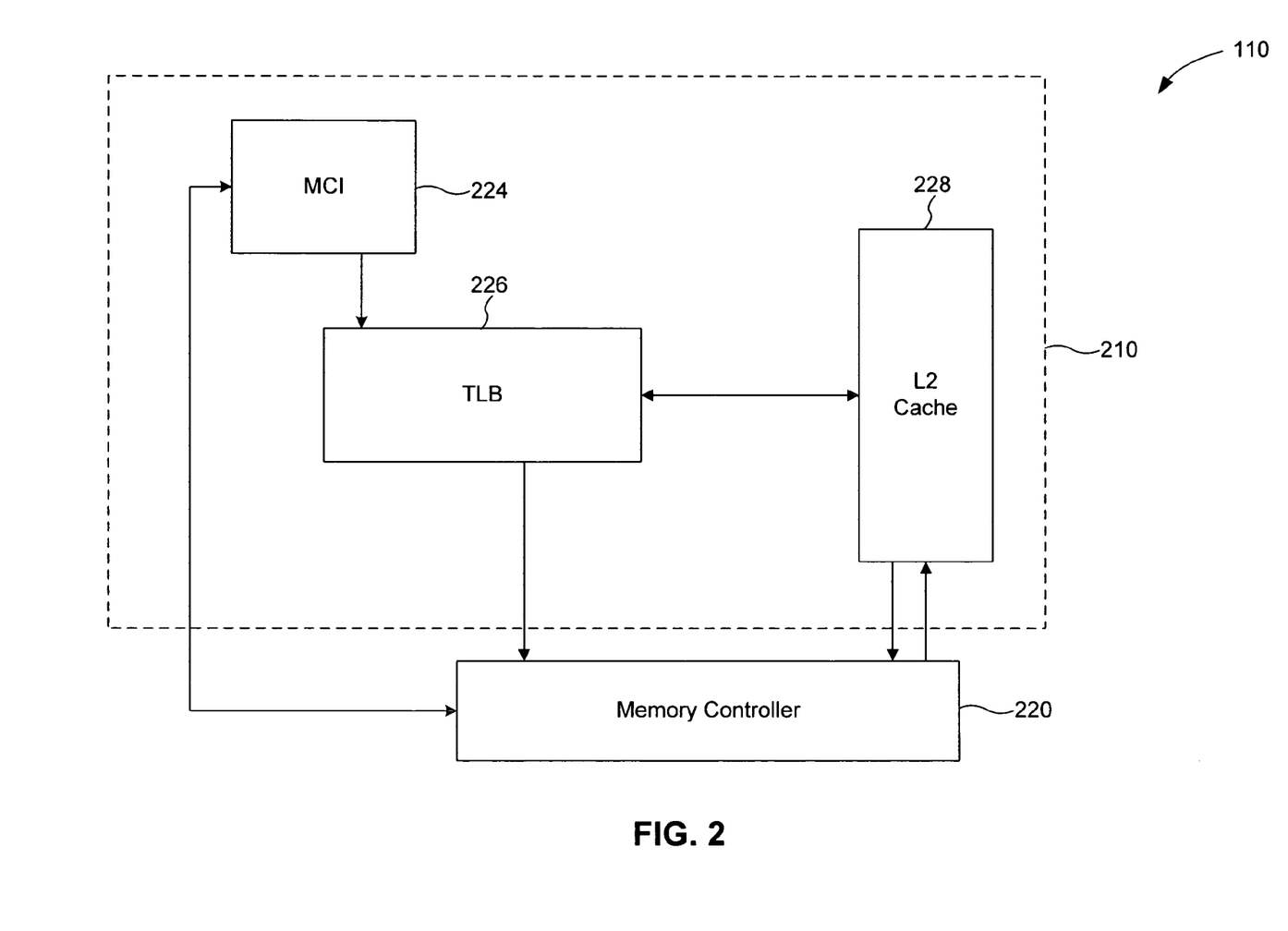
FIG. 2 illustrates example components of a co-processor having one memory channel in accordance with an embodiment of the present invention.
Figure 3:
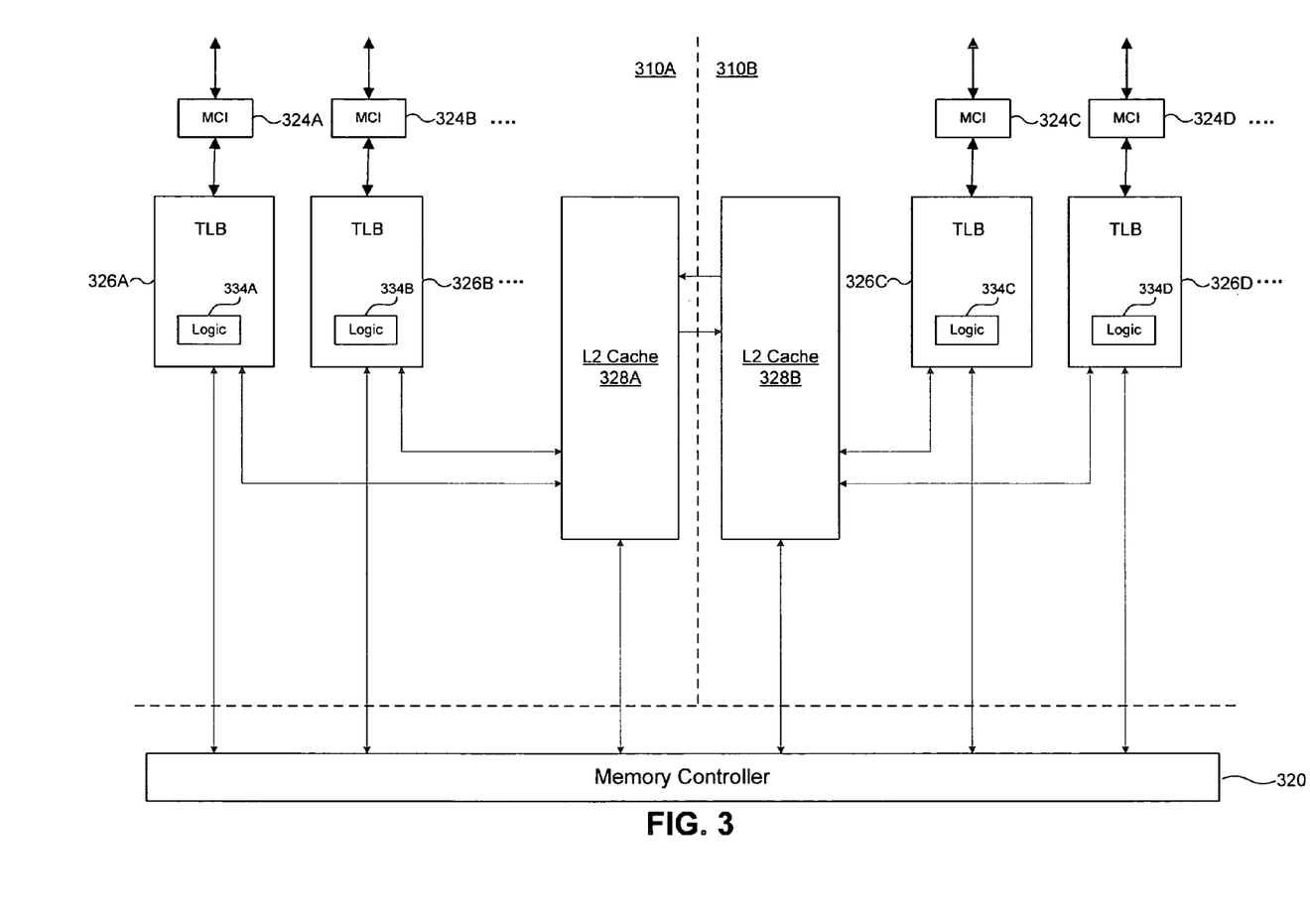
FIG. 3 illustrates example components of a co-processor having a plurality of memory channels in accordance with an embodiment of the present invention.

FIGS. 2 and 3 are block diagrams that illustrate embodiments of coprocessor 110. FIG. 2 is a block diagram illustrating an embodiment in which coprocessor 110 includes one memory channel. FIG. 3 is a block diagram illustrating an embodiment in which coprocessor 110 includes a plurality of memory channels. Although the embodiments shown in FIGS. 2 and 3 include a cache hierarchy including L1, L2 and (optionally) L3 caches, other embodiments feature cache hierarchies with additional levels, including L4 caches, L5 caches, and so on.

1. A Page Table Unit Including on Memory Channel

As illustrated in FIG. 2, coprocessor 110 includes a memory client interface (MCI) 224, a translation look-aside buffer (TLB) 226, a level two (L2) cache 228, and a memory controller 220. MCI 224, TLB 226, and L2 cache 228 may be included in a page table unit 210.

Coprocessor 110 receives requests for memory access from a plurality of memory clients (such as, for example, thirty or more memory clients). A memory client can be any application requiring access to physical memory, either local memory 106 or system memory 104. For example, a texture unit of a graphics processing unit (GPU) is a memory client that makes only read requests. Memory clients may include any other processes running on any hosts that communicate via a common bus with coprocessor 110.

Some of the memory clients work in physical memory space and some of the memory clients work in virtual space. One function of the memory channel is to provide physical memory clients access to memory controller 220. MCI 224 forwards memory access requests from the physical memory clients directly to memory controller 220.

Another function of the memory channel is to perform logical to physical address translations on behalf of virtual memory clients. This translation is based on page table data located in local memory. The translation is page-based with a fixed page size of 4K (4,096) bytes. An embodiment supports a logical address space of up to 4 G (4,294,967,296) bytes or 1M (1,048,576) pages. Each page is represented as a 64-bit page table entry (PTE) in the physical page table. By way of example, forty bits are used for actual address generation. Accordingly, the supported physical address space range can span 1T (1,099,511,627,776) bytes using sparse allocation. Each PTE may includes a page base address (such as a 28-bit address) and other information, as described in more detail below.

Page table unit 210 may simultaneously support a plurality of active physical page table contexts, such as, for example, eight or more contexts. A first page table context 0 is reserved for the so-called system context. The remainder can be assigned at will, but in one embodiment various clients each have their own independently managed page table contexts. Types of clients include for example, video, multi-media, and 3D graphics clients. Multimedia clients use a context that is independent from the 3D graphics client context. Context switching is described in more detail below.

MCI 224 forwards a memory access request from a virtual memory client to TLB 226, which is a dedicated L1 TLB. The memory access request includes a logical memory address, a client ID, and information to indicate whether the request is privileged. TLB 226 includes a fixed number of PTEs, which translate logical memory addresses into physical memory addresses. TLB 226 performs a cache lookup on the logical memory address associated with the virtual memory client's request. If the translation can be performed based on the PTEs already present in TLB 226 (referred to herein as a "TLB hit"), then the associated memory request is forwarded to memory controller 220 with a physical address in place of the previous logical address. If, on the other hand, the translation cannot be performed (referred to herein as a "TLB miss"), the memory access request may be forwarded to L2 cache 228, along with a separate request to update TLB 226, as described in more detail below.

L2 cache 228 includes a greater number of PTEs compared to TLB 226, and therefore L2 cache 228 can translate a greater number of virtual memory addresses compared to TLB 226. However, a memory translation performed by L2 cache 228 takes longer than a memory translation performed by TLB 226. If L2 cache 228 includes a PTE to translate the logical memory address (referred to herein as an "L2 hit"), the PTE will be transferred to the requesting TLB 226 where the translation process will proceed as before. If, on the other hand, the L2 cache 228 does not include the PTE to translate the logical memory address, L2 cache 228 must retrieve a portion of the memory-resident page table from local memory 106 via its own interface to memory controller 220. Various levels of latency may exist in TLB 226 and L2 cache 228 depending on the ultimate location of the requested mapping data. Therefore, also included are several latency compensation data structures in which to temporarily store request data while the translation data returns out of order.

Memory controller 220 coordinates access to physical memory, including local memory 106 and system memory 104, based on the physical memory addresses received from MCI 224, TLB 226, and L2 cache 228.

2. A Page Table Unit Including a Plurality of Memory Channels

FIG. 3 is a block diagram of an embodiment of coprocessor 110 in which two page table units 310A and 310B are used, thus duplicating the L2 cache functionality. Page table unit 310A and page table unit 310B include similar elements and communicate with each other through respective L2 caches 328A and 328B.

Each page table unit handles roughly one-half of the memory clients. Significant performance enhancement can be achieved when each L2 cache 328 can access the other L2 cache 328 as an effective L3 cache. This can be done with a minimal number of wires, and thus is an efficient design.

In an embodiment, TLBs are assigned to L2 caches based on attributes of incoming memory requests and the amount of incoming memory requests across the L2 caches. For example, the least significant bit (LSB) of an incoming logical page address can be used to efficiently allocate this logical page address to a first L2 cache or a second L2 cache. If the LSB is 0, the logical page address can be sent to the first L2 cache; and if the LSB is 1, the logical page address can be sent to the second L2 cache. Other schemes for assigning incoming requests to available L2 caches can be used as would be apparent to a person skilled in the relevant art(s).

Page table unit 310A includes MCIs 324A and 324B. MCIs 324A and 324B receive memory access requests from respective memory clients and communicate the requests to respective TLBs 326A and 326B. TLBs 326A and 326B each access a memory controller 320. TLB 326A and 326B include logic 334A and 334B, respectively.

Page table unit 310A further includes L2 cache 328A, which has its own interface to memory controller 320. As will be explained further below, L2 cache 328A serves as a L2 cache for TLBs 326A and 326B, and as a L3 cache for TLBs 326C and 326D of page table unit 310B.

Page table unit 310B includes MCIs 324C and 324D. MCIs 324C and 324D receive memory access requests from respective memory clients and communicate the requests to respective TLBs 326C and 326D. TLBs 326C and 326D each access memory controller 320. TLBs 326C and 326D includes logic 334C and 334D, respectively.

Page table unit 310B further includes L2 cache 328B, which has its own interface to memory controller 320. As will be explained further below, L2 cache 328B serves as a L2 cache for TLBs 326C and 326D, and as a L3 cache for TLBs 326A and 326B of page table unit 310A.

In one embodiment, each TLB 326 (in page table units 310A and 310B) is a relatively small fully associative cache that performs fast address translations. Various sizes of TLB 326 can be used, for example to accommodate the performance requirements of various clients. In one embodiment, two sizes of TLB 326 are used for different classes of clients, a relatively larger TLB 326 for relatively higher-performance clients, and a relatively smaller TLB 326 for relatively lower-performance clients. The two sizes are assigned to different classes of clients as appropriate.

Logic 334 facilitates translation of logical memory addresses to physical memory addresses. The translation may be based on a size of a fragment in which a logical page exists, as described, for example, in U.S. patent Ser. No. 11/549,570 to Kruger et al., entitled "Virtual Memory Fragment Aware Cache" and filed Oct. 13, 2006, and in U.S. patent application Ser. No. 11/102,210 to Kruger et al., entitled "Method and Apparatus for Fragment Processing in a Virtual Memory System" and filed Apr. 7, 2005, the entirety of each of the foregoing patent applications is incorporated by reference herein. In this embodiment, each TLB 326 can perform a comparison over a larger range than just the number of entries in TLB 326, limited only by the size of that fragment. A comparison can thus be performed over a larger search space.

If page table mode is not enabled, incoming requests from memory clients are forwarded directly to memory controller 320 with no additional latency. When page table mode is enabled, a per-request translate signal along with a context field determines how any lookups are performed. If translation is on, the per-request context field selects the associated page table context. If translation is off, the address is first checked against an aperture range, and if it is within that range, the address will be looked up using system context 0. If outside that range, the address may be treated as physical, or even ignored depending upon register settings.

As the first step in the actual address lookup process, addresses associated with requests from memory clients are checked against the entries in TLB 326. If the address already matches one of the entries from TLB 326, the requesting address is transformed from logical to physical address space and the request is forwarded to memory controller 320. For reads, a tag associated with each request allows the originating memory client to identify returning data independent of the change in logical to physical addresses. Similarly, for writes an index field allows for write notification.

If the address cannot be translated by TLB 326, then the upper twenty or more bits of the page address and the page table context field (from the client) are passed to L2 cache 328. Significant latency may occur here, so the data associated with the request (including any write data) is saved in a latency compensation queue according to a hit-under-miss scheme. A miss-under-miss scheme may also implemented for latency compensation, as described in more detail below. An index that identifies the queued entry is also passed to L2 cache 328 so that returning data can be associated with the original request. In an embodiment, the return data comprises a 28-bit physical page address, a 5-bit fragment field, one system bit, one snooping bit, and one fault bit along with the original request index. If a fault occurred during translation in L2 cache 328, a memory client will drop writes or substitute reads from a default page. When no fault occurs, the new PTE data provided by L2 cache 328 replaces one of those already in TLB 326, and processing continues as described for the initial hit case. In an embodiment, the entries in the work queue of TLB 326 are actually small state machines that act to optimize miss-under-miss processing, as described in more detail below.

There are multiple read memory clients and multiple write memory clients, not all of which require page table interfaces. For example, there can be more than 20 read memory clients and more than ten write memory clients. As previously discussed, there are various classes of clients and various TLB sizes. The relatively larger TLBs have larger latency compensation structures than do the relatively smaller TLBs. Client assignments to page table units can be designed to reflect the physical layout of the chip, and the relative numbers of client classes between the two units may become somewhat unbalanced as a result. In some cases, dummy clients are inserted to keep the numbers of each class of client the same for each of page table units 310A and 310B.

In an embodiment, if the cache line is not present, L2 cache 328 makes a request to the other L2 cache 328 in the other page table unit as an L3 request using the 27-bit cache line address. In this case, the result (hit or miss) comes back in a fixed number of cycles along with 256 bits of cache line data. If there is an L3 hit, the cache line data will replace an already existing cache line and request processing continues as before.

If the L3 misses, then L2 cache 328 logic issues a read request to memory controller 320 via its own memory controller interface. This request looks like a memory read request from any other memory read client. As the read request may entail significant latency, L2 cache 328 logic has its own latency compensation queue for storing read request data while waiting for the read data to return. A multi-bit index describing the queue store location is submitted along with the read request for later identification. Once the data returns, it replaces an already existing cache line and request processing continues as before.

C. Page Table Entries

A page table is a mapping of virtual address space to physical address space. In an embodiment, there are up to eight different mappings. However, more than eight mappings may be used without deviating from the spirit and scope of the present invention. Each mapping can be managed independently of all the other mappings.

Each mapping is associated with a context. A context implies a page table and the set of registers used to manipulate the page table. There can be multiple, independent page tables active at one time. In one example, flat page tables are implemented. In another example, multi-level pages tables or some combination of multi-level and flat page tables are used. Flat and multi-layer page tables are described in more detail below.

1. A Flat Page Table

Coprocessor 110 supports a flat page table. In a flat page table model, the entire page table is laid out linearly in memory. Given a page table base address in physical memory, and a starting mapping address and ending mapping address in logical memory, the page table unit (such as page table unit 210 of FIG. 2 or page table units 310 of FIG. 3) computes the physical address corresponding to a logical PTE. The page table base address may be on any 4 Kb (4,096 byte) boundary, but the starting and ending mapping addresses may or may not be restricted to 2 Mb (2,097,152) boundaries and specify an inclusive range. When requiring 2 Mb boundaries, all mappings are considered invalid if the upper eleven bits of the last mapping address is arithmetically less than those of the first mapping address. The PTE address can be expressed as shown in Equation 1.

$$\text{PTE address} = \{\text{BASE\_ADDR}[31:12], 12'b0\} + (\{\text{LOG\_ADDR}[31:12], 12'b0\} - \{\text{START\_ADDR}[31:21], 21'b0\}) >> 9 \qquad \text{Equation 1}$$

In general, the flow of control in response to a TLB 326 request follows this sequence in a flat page table model:

Given context and page address plus page table description, compute address of PTE cache line in physical memory;

If cache line is already present in L2 Cache, then extract PTE, perform fault processing and return data to requesting L1 TLB (done);

Otherwise, pass cache line address to L3 Cache (if available) and check for hit/miss after fixed number of cycles;

If there is an L3 hit, retrieve L3 cache line data, store in L2, extract PTE, process faults and return to requesting L1 TLB (done);

Otherwise, save request data and issue read request for cache line to the memory controller;

When the memory controller read data returns, store the data in L2, extract PTE, process faults and return to requesting L1 TLB (done).

Figure 4A:
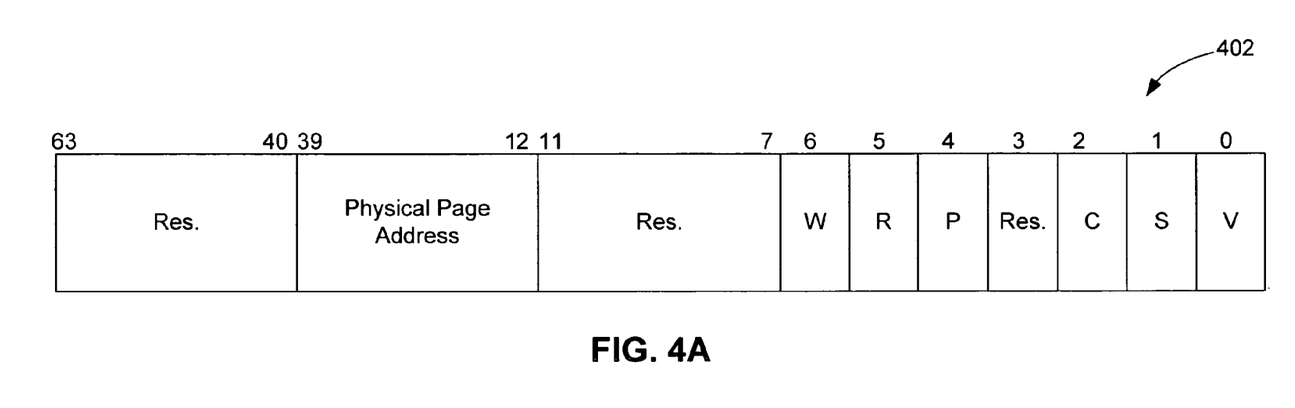
FIGS. 4A and 4B illustrate example Page Table Entries (PTE) and Page Directory Entries (PDE) in accordance with embodiments of the present invention.

FIG. 4A is a diagram of an example PTE 402 in accordance with the present invention. Each page in the page table is 4 k-bytes in size. In the embodiment of FIG. 4A, each PTE 402 is a 64-bit (8 byte) word. There is one PTE 402 for each 4 k-byte logical page of addressable memory. This allows the page table logic to generate up to 64 bits of output given a 32-bit input address. In an embodiment, the lower 40 bits of 64-bit PTE 402 are used for translation purposes.

PTE 402 includes a 28-bit Physical Page Address field containing a physical 4 Kb-aligned base address of a mapped page. A valid (V) bit indicates whether the given PTE 402 contains a valid mapping. If a request is made to an invalid page, then a valid protection fault occurs. Depending upon how the page table control registers are programmed in various embodiments, this condition may cause writes to be dropped and may perform reads from default pages. Alternatively, the page table unit arranges to interrupt the host and possibly initiate a coprocessor context switch.

PTE 402 also includes a system (S) bit. The S bit indicates whether a page is located in local memory 106 or system memory 104. This bit indicates when data must be read or written over the PCIE bus.

PTE 402 also includes a cache (C) bit. The C snooping bit indicates that read/write accesses to the page must be made using a snooped cycle. The cache snooping bit is useful when writing to memory pages, as it alerts processors on the bus that cached data may have to be invalidated.

Three access protection bits are available. A write (W) bit indicates that the given page can be written. A read (R) bit indicates that the given page can be read. A privileged (P) bit indicates a page that can only be accessed when the context requesting access is operating in a privileged mode. In another embodiment, the privileged mode is set on a per request basis.

2. A Multi-Level Page Table

Each page table unit supports multi-level page tables. Any special processing associated with multi-level page tables is performed by L2 cache logic, such as logic (not shown) included in L2 cache 228 and/or L2 cache 328. L2 cache logic computes the address of the PDE from a page directory and goes through the same type of read request processing as for the L1 TLB request. Once the PDE is present in the L2 cache or separate PDE cache, the L2 cache logic computes the cache line address of the PTE from the page table.

The multi-level page table model offers one or more levels of indirection in order to support more flexibility in the physical layout of the page table. Instead of a base address that points to a linearly contiguous page table in physical memory, this model has a pointer to a special page known as a page directory. This page directory contains 1024 page directory entries (PDEs), each of which points to a second level 4 k-byte page table. Each $2^{nd}$ level 4 k-byte page table contains 512 64-bit PTEs. The second level page tables may be allocated discontiguously, or may even be left out if a given range of addresses is not to be used.

In another embodiment, page table blocks may include more than one page, typically $2^n$ pages where n is an integer. Additionally, page directories may also include more than one page under alternate conditions.

Figure 4B:
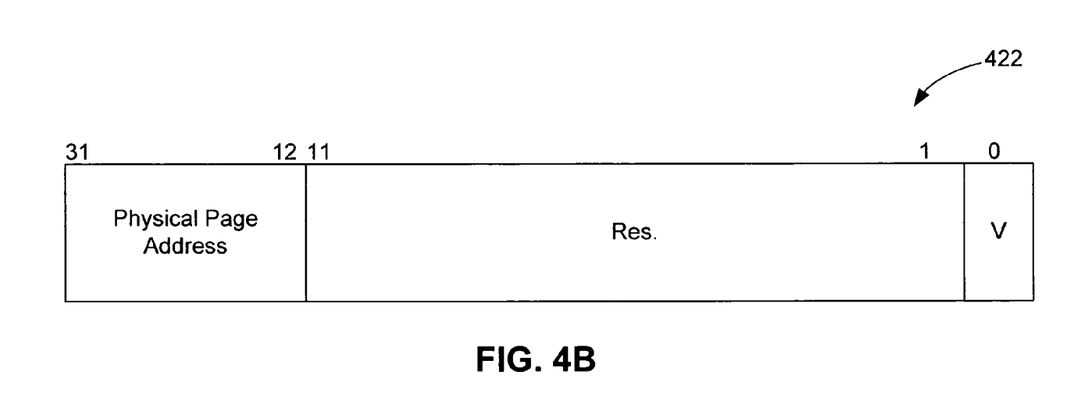

FIG. 4B is an illustration of an example format of a PDE 422. The twenty most significant bits of the PDE 422 contain the physical base address of the second level page table. Unused entries are marked with a valid (V) bit of 0 meaning that all addresses within that corresponding range are invalid. References to pages in these invalid ranges cause PDE protection faults which can be handled as described with reference to the PTE above.

There may be up to three memory request cycles when fulfilling requests from a multi-level page table. However, other numbers of memory request cycles may be used without deviating from the spirit and scope of the present invention. The multi-level page table case follows the general flow:

Given context and page address plus page table registers, compute address of PDE cache line in physical memory;

If cache line already present in L2 Cache, extract page table address from PDE and continue using flat page table flow (done);

Otherwise, pass cache line address to L3 Cache and check for hit/miss after fixed number of cycles;

If L3 hit, retrieve L3 cache line data, store in L2, extract page table address from PDE and continue using flat page table flow (done);

Otherwise, save request data and issue read request for cache line to MC;

When MC read data returns, store in L2, extract page table address from PDE and continue using flat page table flow (done).

Interfaces to the page table as described herein include a translate field and a context field. The translate field instructs the page table unit (such as page table unit 210 of FIG. 2 or page table units 310 of FIG. 3) to perform logical to physical address translations using a context selected by the context field. If the translate signal is de-asserted, this instructs the page table unit to treat the provided address as physical if outside a provided aperture or, if inside the aperture, to look up the address in the special system context 0.

Each page table unit supports multiple page table contexts. Each client can be programmed such that values in the context field select from the available page table contexts. The value in the context field can be statically overridden via per-client register programmable bit fields. An example method for flushing an L2 cache during a context switch is described in more detail below.

III. Miss-Under-Miss Processing

As described above, miss-under-miss processing occurs when there is a miss in a TLB. In conventional multi-level cache systems, if there is a miss in a TLB (or L1 cache), a request is automatically forwarded to the L2 cache. In an embodiment of the present invention, an entry in a TLB only submits a request to the L2 cache (such as L2 cache 228 of FIG. 2 or L2 cache 328 of FIG. 3) if another entry in the TLB is not awaiting translation data from the L2 cache that corresponds to the request. This embodiment may reduce the amount of traffic between the TLBs and the L2 cache when there are multiple misses to the same page. The reduction in traffic may be significant any time a burst of activity starts, such as, for example, when a memory client opens a new page for reading/writing.

Figure 5:
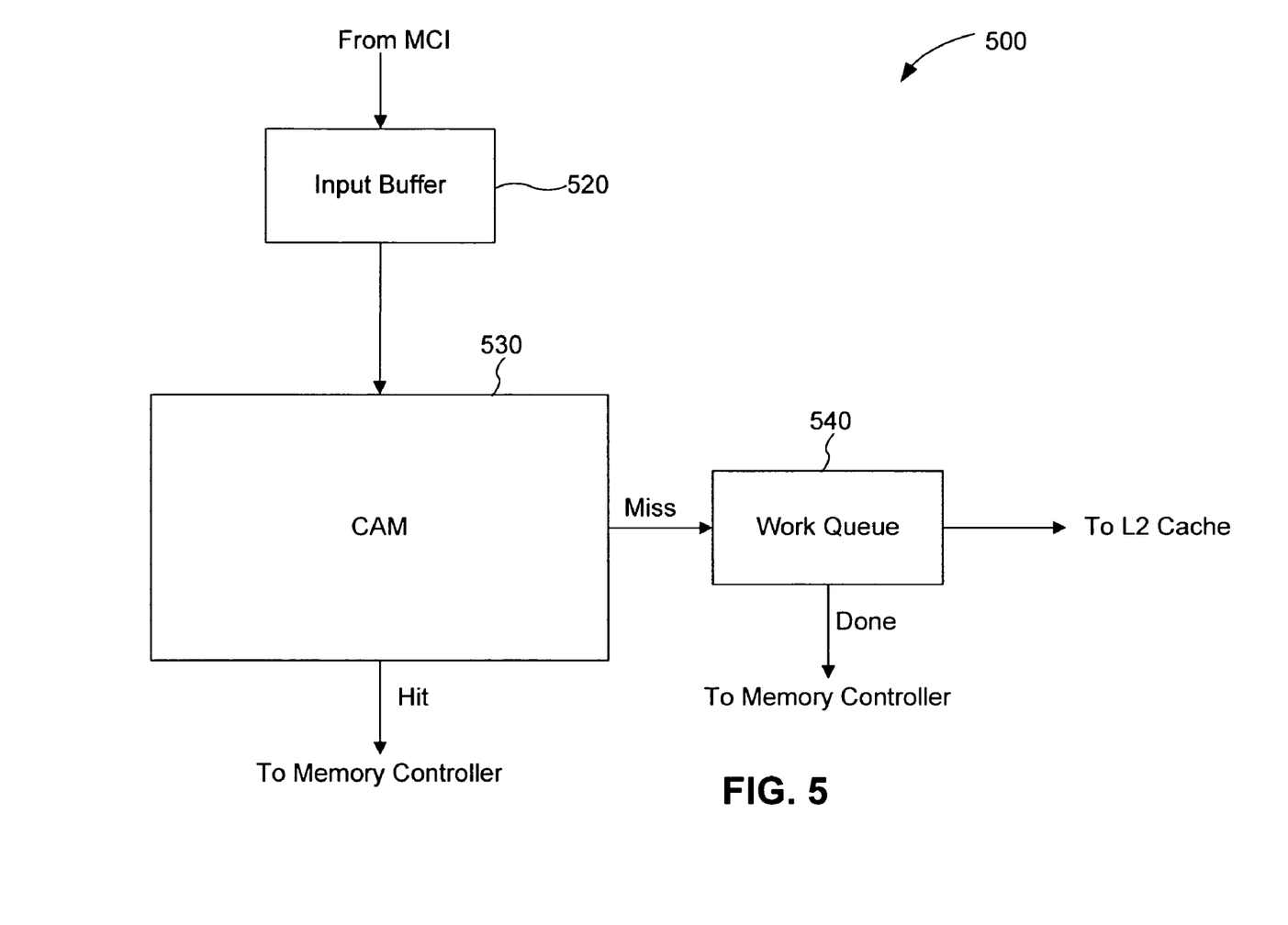
FIG. 5 illustrates an example translation look-aside buffer in accordance with an embodiment of the present invention.

FIG. 5 illustrates components of an example TLB 500, such as TLB 236 of FIG. 2 or TLB 336 of FIG. 3, in accordance with an embodiment of the present invention. As illustrated in FIG. 5, TLB 500 includes an input buffer 520 (optional), a content addressable memory (CAM) 530, and a work queue 540.

TLB 500 optionally includes input buffer 520, which receives memory access requests from the memory client interface (such as MCI 224 of FIG. 2 or MCI 324 of FIG. 3). Each memory access request includes a logical memory address. The memory access requests are then sent to CAM 530. Alternatively, the memory access requests may be forwarded directly from the memory client interface to CAM 530.

CAM 530 includes a plurality of PTEs that provide mappings between logical memory addresses and physical memory addresses. The number of PTEs in CAM 530 may be different for different embodiments, and may include, for example, 2 entries, 8 entries, 16 entries, 32 entries, or some other number of entries. The search key for CAM 530 is the logical address of the memory access request. If there is a hit in CAM 530, the logical memory address is translated to a physical memory address and the request is forwarded to the memory controller (such as memory controller 220 of FIG. 2 or memory controller 320 of FIG. 3), as described above. If, on the other hand, there is a miss in CAM 530, a latency compensation request is sent to work queue 540.

Work queue 540 includes a plurality of entries that each store data for a request, while providing latency compensation. The number of entries in work queue 540 may correspond to the number of PTEs stored in CAM 530, or may be completely uncorrelated with the number of PTEs stored in CAM 530. Each entry in work queue 540 comprises a state machine that determines whether to send its latency compensation request to the L2 cache based on the data contained in the latency compensation requests stored in other entries of work queue 540, as described in more detail below. If work queue 540 issues a request to the L2 cache, work queue 540 will eventually receive a physical memory address corresponding to the request. In an embodiment, after receiving the physical memory address, work queue 540 sends a DONE signal to the memory controller (such as memory controller 220 of FIG. 2 or memory controller 320 of FIG. 3).

Figure 6:
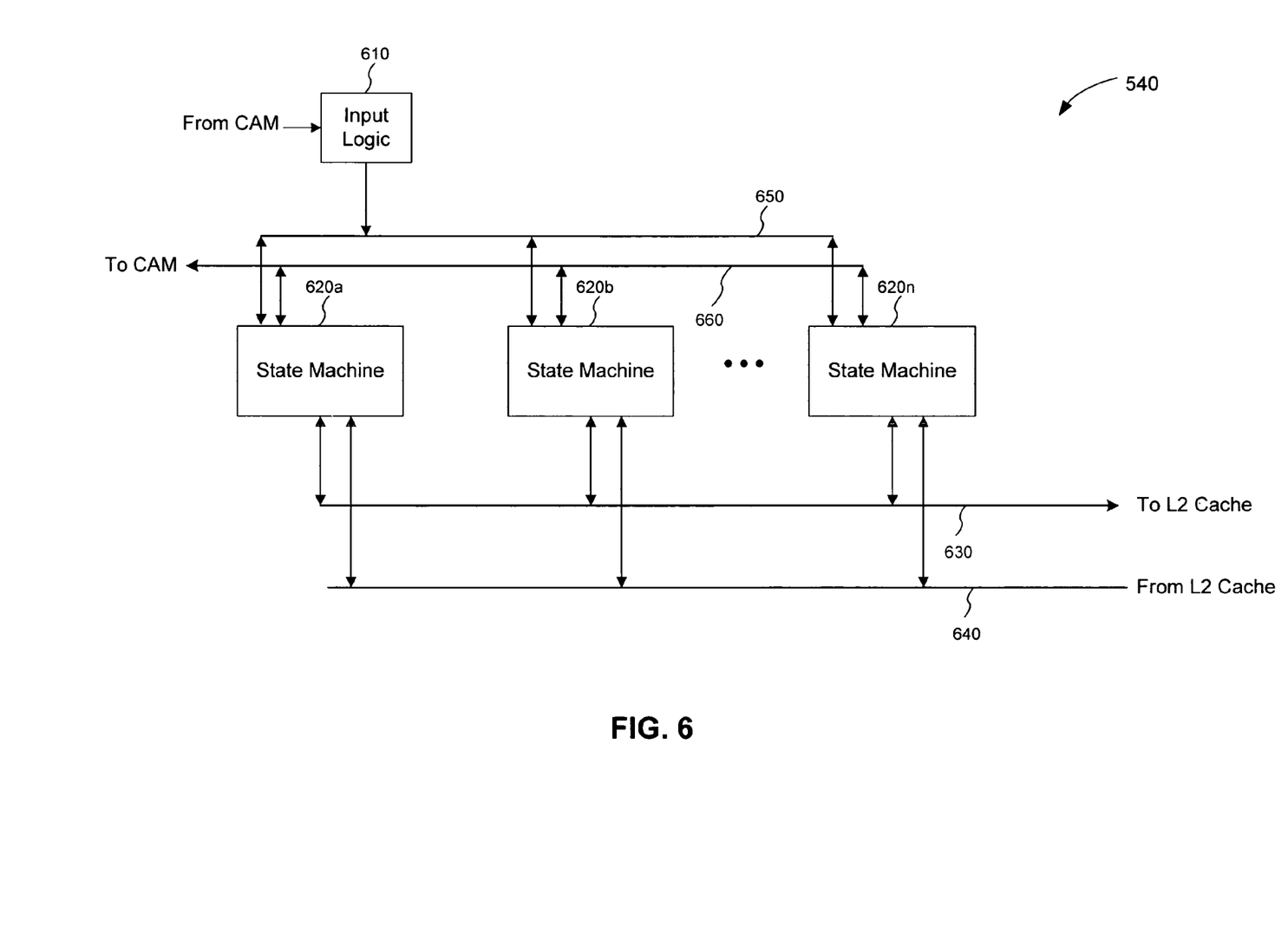
FIG. 6 illustrates an example work queue in accordance with an embodiment of the present invention.

For example, FIG. 6 illustrates components of work queue 540 in accordance with the present invention. As illustrated in FIG. 6, work queue 540 includes input logic 610 and a plurality of state machines 620a through 620n. Input logic 610 receives a latency compensation request after a miss in CAM 530. Input logic 610 forwards the latency compensation request to one of state machines 620 via a bus 650.

Each state machine 620 may be in one of a plurality of states, including "free," "waiting-to-send-data," "waiting-to-receive-data," and "done." In the "free" state, a state machine 620 is available to receive a latency compensation request broadcast on bus 650. In the "waiting-to-send-data" state, a state machine 620 is waiting to send data to the L2 cache via bus 630. In the "waiting-to-receive-data" state, a state machine 620 is waiting to receive translation data from the L2 cache via bus 640. In the "done" state, a state machines 620 received translation data from the L2 cache that may then be transmitted to the CAM on bus 660.

If state machines 620 could not snoop on bus 650, bus 630, and bus 640, then each state machine 620 would progress from state to state in the following order: (1) "free"; (2) "waiting-to-send-data"; (3) "waiting-to-receive-data"; and (4) "done." However, because state machines 620 may snoop on bus 650, bus 630, and bus 640, state machines 620 may skip one or more of the states, as described in more detail below. In this way, the traffic between TLB 500 and the L2 cache can be reduced.

For example, a state machine 620 may transition from "free" directly to "waiting-to-receive-data" based on data broadcast on bus 650. For illustrative purposes and not limitation, suppose state machine 620a is in the "free" state and state machines 620b through 620n are in the "waiting-to-receive-data" state. Accordingly, state machine 620a may receive a new latency compensation request from input logic 610 via input bus 650 and state machines 620b through 620n may store their own latency compensation requests.

State machines 620b through 620n snoop on input bus 650 as state machine 620a receives the new latency compensation request. If, for example, state machine 620b is waiting for translation data corresponding to the new latency compensation request received by state machine 620a, state machine 620b transmits a message on bus 650 indicating that it is already awaiting translation data corresponding to the new latency compensation request. As a result of the message from state machine 620b, state machine 620a may immediately transition to "waiting-to-receive-data," skipping over the "waiting-to-send-data" state. Because state machine 620a may transition to "waiting-to-receive-data" without even transmitting its request to the L2 cache, the traffic between work queue 540 and the L2 cache can be reduced.

As another example, based on data broadcast on bus 630, a state machine 620 may transition from "waiting-to-send-data" to "waiting-to-receive-data," without even transmitting a request to the L2 cache. For illustrative purposes and not limitation, suppose state machine 620a is in the "waiting-to-send-data" state. Suppose further that state machine 620b transmits a request to the L2 cache via bus 630. State machine 620a snoops on bus 630. If the request transmitted by state machine 620b corresponds to the request that state machine 620a is currently storing, then state machine 620a may transition to "waiting-to-receive-data," without ever transmitting its request to the L2 cache. In this way, traffic between the work queue 540 and the L2 cache can be reduced.

As a further example, a state machine 620 may transition directly to "done" based on data received on bus 640, even if that state machine 620 never transmitted its request to the L2 cache. For illustrative purposes and not limitation, suppose state machine 620a is in the "waiting-to-send-data" state, and suppose further that state machine 620b is in the "waiting-to-receive-data" state. If state machine 620b receives translation data from the L2 cache before state machine 620a sends its request, and if the translation data corresponds to the request stored by state machine 620a, then state machine 620a may transition to "done," without every sending its request to the L2 cache.

A first state machine may determine that a first latency compensation request that it stores corresponds to a second latency compensation request stored by a second state machine based on data included in the first and second latency compensation requests. For example, each latency compensation request may include the following data: a context field; a logical memory address; an endian mode field; a privileged field; a size field (read clients only); a tag field (read clients only); an index/tag tag field (write clients only); a mask field (write clients only); and a write data field (write clients only). The first state machine may determine that data broadcast on bus 650, bus 630, or bus 640 corresponds to the first latency compensation request that it stores based on, for example, the context field, the logical memory address, the privileged field, or some other data included in the data broadcast on bus 650, bus 630, or bus 640, as would be apparent to a person skilled in the relevant art(s).

The examples state transitions presented above are included for illustrative purposes only, and not limitation. Other examples of state transitions may be realized based on the structure disclosed herein without deviating from the spirit and scope of the present invention.

IV. Cache Flushing

Cache flushing is now described in accordance with the present invention. As mentioned above, a page table unit may handle a plurality of page tables, such as eight page tables, for example. At times during normal processing, a page table may be modified or swapped out for a new page table. For example, a page table may be modified or swapped during a preemption operation, a context switch, stall-on-fault condition, or some other type of operation executed by computer system 100. For illustrative purposes, and not limitation, the cache flushing embodiments of the present invention are described below in terms of context switching. It is to be appreciated, however, that such cache flushing embodiments are equally applicable in other situations in which a page table is modified. Furthermore, for illustrative purposes only, and not limitation, these cache flushing embodiments are described below in terms of page table unit 310A of FIG. 3.

A. Overview

When a context switch is initiated, L2 cache 328A may process requests corresponding to an old context (i.e. a previously operating context) for an indeterminate amount of time. This is because the amount of time that it takes L2 cache 328A to process a translation request is dependent on whether there is a hit or miss in L2 cache 328A. For a hit, L2 cache 328A may process a translation request in, for example, approximately 28 cycles. For a miss, on the other hand, L2 cache 328A may process a translation request in, for example, approximately one hundred or several hundred cycles.

Translation data from L2 cache 328A that corresponds to an old request must not be allowed to return after a new context is in place and running. For example, in an embodiment, there are twenty TLBs that participate in a graphics context switch, and they all must synchronize their states in order for the context switch to occur properly. A context switch can occur in a TLB when there are L2 translations waiting to finish. If the L2 translations returned to the TLB after the context switch has occurred, the L2 translations may not represent valid translations.

L2 cache 328A is a complex translation processor running multiple pipelined streams of translation requests in parallel. That is, L2 cache 328A includes a plurality of translation paths. In these paths, there are many general purpose first-in first-out (FIFO) data structures that do not retain information regarding the specifics of the data held therein. As a result, it is not easy to predict where to find translation requests corresponding to an old context. Thus, it is not a simple task to cancel all requests from an old context without affecting translation requests in L2 cache 328A that correspond to valid contexts.

To insure that translation data corresponding to an old request is not returned to a TLB, such as TLB 326A, when a context switch occurs, a context flushing embodiment of the present invention provides a process to flush L2 cache 328A in a fashion which allows synchronization with steps of the context switch. In this embodiment, TLB 326A issues special flush packets that traverse all possible translation paths within L2 cache 328A. When all the flush packets return to TLB 326A, L2 cache 328A is guaranteed to be flushed of all translation requests corresponding to an old context. At this point, TLB 326A may send a signal indicating that the context switch has completed, as described in more detail below.

B. Flush Packets

A context switch may be initiated by a process or entity external to TLB 326A, such as coprocessor 110, CPU 102, the operating system, or some other process external to TLB 326A. Upon receipt of a signal initiating a context switch, TLB 326A must synchronize with several internal and external operations. To understand the processes that TLB 326A executes during a context switch, it is helpful to represent TLB 326A as a four-state, sequential state machine. The four states are "release," "wait-for-freeze," "freeze," and "wait-for-release."

The "release" state is the normal operating state. During this state, for example, TLB 326A send translation requests to and receive translation data from L2 cache 328A. Upon receipt of a signal initiating a context switch, TLB 326A transitions to the "waiting-for-freeze" state.

During the "wait-for-freeze" state, TLB 326A ignores any returning translation data from L2 cache 328A. In addition, TLB 326A may perform other synchronization and data saving operations. At the end of the "wait-for-freeze" state, TLB 326A issues an acknowledgement signal back to the external process or entity that initiated the context switch and transitions to the "freeze" state.

During the "freeze" state, TLB 326A ignores any returning translation data from L2 cache 328. In contrast, however, L2 cache 328A does not freeze. It continues to operate on behalf of all other page table contexts (i.e., those contexts that are not switching). TLB 326A transitions from the "freeze" state to the "wait-for-release" state after it issues a flush packet to L2 cache 328A.

During the "waiting-for-release" state, TLB 326A waits for the return of all flush packets. A flush packet is a special kind of packet that is sent to L2 cache 328A. L2 cache 328A includes control logic that can recognize flush packets. For example, the flush packet may include a special flush bit or some other flag that identifies it as a flush packet. The control logic in L2 cache 328A causes the flush packet to be replicated at each bifurcation point in L2 cache 328A to ensure that the flush packet traverses all possible translation paths within L2 cache 328A, as described in more detail below with reference to FIG. 7. After receiving all the flush packets, TLB 326A sends a "done" signal back to the external process or entity indicating that L2 cache 328A is flushed of all translation requests corresponding to the old context. After sending the "done" signal, TLB 326A transition back to the "release" state. In an alternative embodiment, flush packets are issued at the "waiting-for-freeze" state, and any returning flush packets are received while non-flush packets are ignored.

C. Example Translation Paths in an L2 Cache

Figure 7:
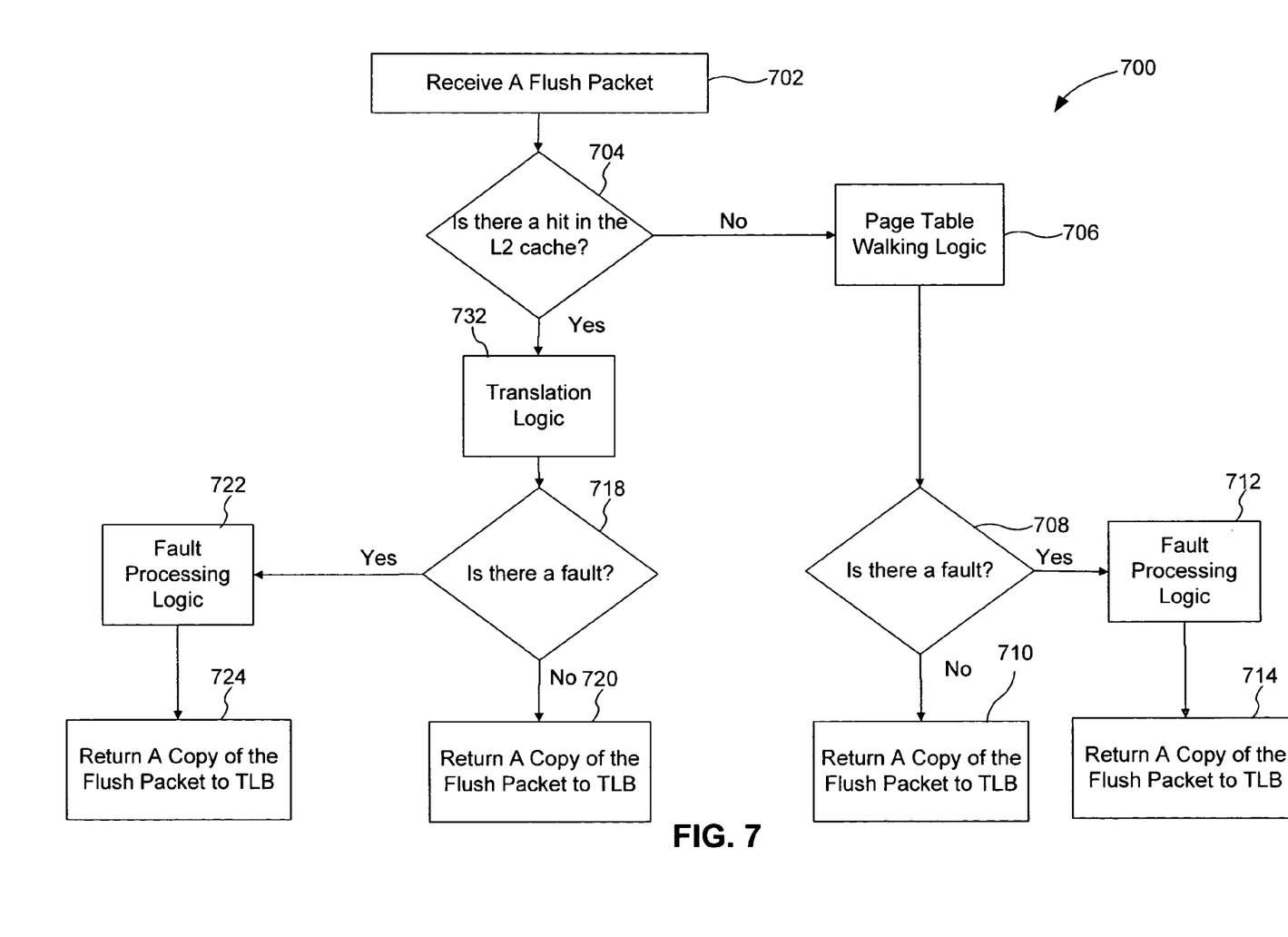
FIG. 7 illustrates example translation paths within an L2 cache in accordance with an embodiment of the present invention.

As mentioned above, a flush packet from TLB 326A is replicated at each bifurcation point, causing a copy of the flush packet to traverse each translation path in L2 cache 328A. For example, FIG. 7 depicts a flowchart 700 illustrating example translation paths within L2 cache 328A. In flowchart 700, the bifurcation points of L2 cache 328A are represented by diamond-shaped decision boxes. Referring to FIG. 7, the process is initiated in a step 702 when L2 cache 328A receives a flush packet from TLB 326A.

A first bifurcation point occurs at a step 704. At step 704, during processing of a normal translation request, L2 cache 328A would determine whether there is a hit or a miss. If there was a hit, a normal translation request would be forwarded to translation logic as illustrated in a step 732. If there was a miss, a normal translation request would be forwarded to page table walking logic, which would walk the page table in local memory to find a translation for the translation request, as indicated in a step 706. Unlike a normal translation request, the flush packet replicates at the first bifurcation point. One copy of the flush packet traverses the "hit" path and another copy of the flush packet traverses the "miss" path.

As the one copy of the flush packet traverses the "hit" path, it reaches a second bifurcation point at a step 718. At step 718, during processing of a normal translation request, L2 cache 328A would determined whether there is a fault. If there was a fault, a normal translation request would passed to fault processing logic, as illustrated in a step 722. If there was not a fault, the translation request would be returned to the requesting TLB without going through the fault processing logic, as indicated in a step 720. Unlike a normal translation request, the flush packet replicates at the second bifurcation point (i.e., step 718). A first copy of the flush packet traverses the "fault" path and a second copy of the flush packet traverses the "no-fault" paths. As a result, TLB 326A will receive the first copy of the flush packet that traversed the "fault" path (after it traverses the fault processing logic), as illustrated in a step 724. Additionally, TLB 326A will receive the second copy of the flush packet that traverses the "no-fault" path, as illustrated in a step 720.

As another copy of the flush packet traverses the "miss" path, it reaches a third bifurcation point at a step 708. At step 708, during processing of a normal translation request, L2 cache 328A would determined whether there is a fault. If there was a fault, a normal translation request would passed to fault processing logic, as illustrated in a step 712. If there was not a fault, the translation request would be returned to the requesting TLB without going through the fault processing logic, as indicated in a step 710. Unlike a normal translation request, the flush packet replicates at the third bifurcation point (i.e., step 708). A third copy of the flush packet traverses the "fault" path and a fourth copy of the flush packet traverses the "no-fault" paths. As a result, TLB 326A will receive the third copy of the flush packet that traversed the "fault" path (after it traverses the fault processing logic), as illustrated in a step 714. Additionally, TLB 326A will receive the fourth copy of the flush packet that traverses the "no-fault" path, as illustrated in a step 710.

Thus, in the example illustrated in FIG. 7, a flush packet issued by TLB 326A will be replicated into four flush packets corresponding to the four translation path of L2 cache 328A represented by steps 724, 720, 710, and 714. TLB 326A may include a counter to determine when all four flush packets return from L2 cache 328A. The counter may be included, for example, in logic 334A of TLB 326A. The receipt of all four flush packets indicates that L2 cache 328A is flushed of all translation requests corresponding to the context that is being switched. At this point, TLB 326A can send a signal to the process or entity that initiated the context switch to indicate that L2 cache 328A is flushed of all translation requests corresponding to the old context.

V. Conclusion

Systems and methods for miss-under-miss processing and context flushing have been presented. Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

In addition to hardware implementations of coprocessor 110, local memory 106, system memory 104, and CPU 102, such components may also be embodied in software disposed, for example, in a computer usable (e.g., readable) medium configured to store the software (e.g., a computer readable program code). The program code causes the enablement of embodiments of the present invention, including the following embodiments: (i) the functions of the systems and techniques disclosed herein (such as miss-under-miss processing and context flushing); (ii) the fabrication of the systems and techniques disclosed herein (such as the fabrication of coprocessor 110); or (iii) a combination of the functions and fabrication of the systems and techniques disclosed herein.

For example, this can be accomplished through the use of general programming languages (such as C or C++), hardware description languages (HDL) including Verilog HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core that is embodied in program code and may be transformed to hardware as part of the production of integrated circuits.

It is to be appreciated that the Detailed Description section, and not the Abstract, is intended to be used to interpret the claims. The Abstract may set forth one or more but not all exemplary embodiments of the present invention as contemplated by the inventor(s), and thus, are not intended to limit the present invention and the appended claims in any way.

What is claimed is:

1. A system for processing memory access requests, comprising:
    a work queue comprising a plurality of state machines each configured to store one of a plurality of requests for access to logical memory addresses; and
    a translation look-aside buffer (TLB) that receives requests for access to logical memory addresses and that translates a first subset of the received requests from logical memory addresses to physical memory addresses responsive to comparisons between the received requests and a second collection of page table entries included in the TLB;
    wherein a first of the plurality of state machines sends a first request stored therein to a cache if another state machine of the work queue is not awaiting translation data relating to the first request; and
    wherein the TLB sends a second subset of the received requests to the work queue responsive to the comparisons between the received requests and the second collection of page table entries included in the TLB.

2. The system of claim 1, wherein the cache (i) includes a first collection of page table entries and (ii) is configured to receive the plurality of requests from the state machines and return translation data to the state machines responsive to comparisons between the requests received from the state machines and the first collection of page table entries.

3. The system of claim 2, wherein the cache comprises a level two cache.

4. The system of claim 1, wherein the cache is configured to include a greater number of page table entries than the TLB.

5. A computer readable storage medium containing instructions which when executed are adapted to create a processing unit that processes memory access requests, the processing unit comprising:
    a work queue comprising a plurality of state machines each configured to store one of a plurality of requests for access to logical memory addresses; and
    a translation look-aside buffer (TLB) that receives requests for access to logical memory addresses and that translates a first subset of the received requests from logical memory addresses to physical memory addresses responsive to comparisons between the received requests and a second collection of page table entries included in the TLB;
    wherein a first of the plurality of state machines sends a first request stored therein to a cache if another state machine of the work queue is not awaiting translation data relating to the first request; and
    wherein the TLB sends a second subset of the received requests to the work queue responsive to the comparisons between the received requests and the second collection of page table entries included in the TLB.

6. The computer readable storage medium of claim 5, wherein the cache includes a first collection of page table entries, and is configured to receive the plurality of requests from the state machines and return translation data to the state machines responsive to comparisons between the requests received from the state machines and the first collection of page table entries.

7. The computer readable storage medium of claim 6, wherein the cache comprises a translation look-aside buffer.

8. The computer readable storage medium of claim 6, wherein the cache comprises a level two cache.

9. The computer readable storage medium of claim 5, wherein the cache is configured to include a greater number of page table entries than the TLB.

10. A method for processing requests for access to memory, comprising:
    (a) storing a first plurality of requests for access to logical memory in a plurality of state machines of a work queue;
    (b) sending a first request stored in a first of the plurality of state machines to a cache if another of the plurality of state machines is not awaiting translation data relating to the first request;
    (c) receiving translation data from the cache relating to the first request;
    (d) receiving requests for access to logical memory addresses;
    (e) translating a subset of the received requests from logical memory addresses to physical memory addresses responsive to comparisons between the received requests and a second collection of page table entries included in a translation look-aside buffer (TLB); and
    (f) sending, from the TLB, a second subset of the received requests to the work queue responsive to the comparisons between the received requests and the second collection of page table entries included in the TLB.

11. The method of claim 10, wherein the cache is configured to return translation data to the state machines responsive to comparisons between requests received from the state machines and a collection of page table entries included in the cache.

12. The method of claim 10, wherein (a) comprises:
    storing the first plurality of requests in the plurality of state machines of the work queue, wherein the first plurality of requests comprise a second subset of received requests not translated by the TLB.

* * * * *